US009123259B2

(12) United States Patent
Zheng et al.

(10) Patent No.: US 9,123,259 B2
(45) Date of Patent: Sep. 1, 2015

(54) DISCOVERING FUNCTIONAL GROUPS OF AN AREA

(71) Applicant: Microsoft Corporation, Redmond, WA (US)

(72) Inventors: Yu Zheng, Beijing (CN); Nicholas Jing Yuan, Beijing (CN); Xing Xie, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 341 days.

(21) Appl. No.: 13/827,950

(22) Filed: Mar. 14, 2013

(65) Prior Publication Data

US 2014/0278291 A1 Sep. 18, 2014

(51) Int. Cl.
*G09B 29/00* (2006.01)
*G06K 9/62* (2006.01)
*G06Q 50/26* (2012.01)
*G08G 1/01* (2006.01)
*G06F 17/30* (2006.01)
*G06N 99/00* (2010.01)

(52) U.S. Cl.
CPC .............. *G09B 29/007* (2013.01); *G06K 9/62* (2013.01); *G06Q 50/26* (2013.01); *G08G 1/0137* (2013.01); *G06F 17/30713* (2013.01); *G06N 99/005* (2013.01)

(58) Field of Classification Search
None
See application file for complete search history.

(56) References Cited

U.S. PATENT DOCUMENTS

| | | |
|---|---|---|
| 7,984,006 B2 | 7/2011 | Price |
| 8,135,505 B2 | 3/2012 | Vengroff et al. |
| 8,204,886 B2 | 6/2012 | Bickel et al. |
| 8,275,649 B2 | 9/2012 | Zheng et al. |
| 8,645,298 B2 * | 2/2014 | Hennig et al. ................ 706/45 |
| 2007/0005419 A1 | 1/2007 | Horvitz et al. |

FOREIGN PATENT DOCUMENTS

WO WO2012061080 A2 5/2012

OTHER PUBLICATIONS

Pan, Gang, et al. "Land-Use Classification Using Taxi GPS Traces" IEEE Transactions on Intelligent Transportation Systems, vol. 14, No. 1, pp. 113-123 (Mar. 2013) Published Aug. 2012.*
Yuan, Jing, et al. "Discovering Regions of Different Functions in a City Using Human Mobility and POIs" Proceedings of the 18th ACM SIGKDD international conference on Knowledge discovery and data mining, pp. 186-194 (Aug. 2012).*

(Continued)

*Primary Examiner* — Kandasamy Thangavelu
*Assistant Examiner* — Jay B Hahn
(74) *Attorney, Agent, or Firm* — Dan Choi; Judy Yee; Micky Minhas (57) ABSTRACT

Disclosed herein are techniques and systems for discovering functional groups in an area, such as an urban area. A process includes segmenting a map of the area into sections, and inferring, for each section, a distribution of functions according to a topic model framework which considers mobility patters of users and points of interest (POIs) in the section. The topic model framework regards the section as a document, each function as a topic, the mobility patterns as words, and a POI feature vector for the section as metadata. The process may further include clustering the sections based at least in part on a similarity of the distribution of functions between each of the sections to obtain functional groups, estimating a functionality intensity for each of the functional groups, and annotating each of the functional groups.

20 Claims, 8 Drawing Sheets

(56) References Cited

OTHER PUBLICATIONS

Antikainen, "The Concept of Functional Urban Area Findings of the ESPON project 1.1.1", Infomationen zur Raumentwicklung, Jul. 2005, pp. 447-452.
Blei, "Introduction to Probabilistic Topic Models", Communications of the ACM, vol. 55, No. 4, Apr. 2012, 16 pages.
Blei, et al., "Latent Dirichlet Allocation", Journal of Machine Learning Research, vol. 3, Jan. 2003, pp. 993-1022.
Estkowski, "No Steiner Point Subdivision Simplification is NP-Complete", In Proceeding of 10th Canadian Conference of Computational Geometry, Jun. 1998, 10 pages.
Farmer, "Data Driven Functional Regions", In Proceedings of the 10th International Conference on GeoComputation, Nov. 2009, 8 pages.
Ge, et al., "An Energy-Efficient Mobile Recommender System", KDD'10, Proceedings of the 16th ACM SIGKDD International Conference on Knowledge Discovery and Data Mining, Jul. 2010, 9 pages.
Jiang, et al., "Discovering Urban Spatial-Temporal Structure from Human Activity Patterns", UrbComp'12, Proceedings of the ACM SIGKDD International Workshop on Urban Computing, Aug. 2012, 8 pages.
Karlsson, "Clusters, Functional Regions and Cluster Policies", JIBS and CESIS Electronic Working Paper Series No. 84, Mar. 2007, 25 pages.
Lam, et al., "Thinning Methodologies—A Comprehensive Survey", IEEE Transactions on Pattern Analysis and Machine Intelligence, vol. 14, No. 9, Sep. 1992, pp. 869-885.
Liu, et al., "Discovering Spatio-Temporal Causal Interactions in Traffic Data Streams", KDD'11, In Proceedings of the 17th ACM SIGKDD International Conference on Knowledge Discovery and Data Mining, Aug. 2011, pp. 1010-1018.
Mimno, et al., "Topic Models Conditioned on Arbitrary Features with Dirichlet-multinomial Regression", In Proceedings of the 24th Conference in Uncertainty in Artificial Intelligence, Jul. 2012, 8 pages.
Pozdnoukhov, et al., "Space-Time Dynamics of Topics in Streaming Text", Proceedings of the 3rd ACM SIGSPATIAL International Workshop on Location-Based Social Networks, Nov. 2011, 8 pages.
Qi, et al., "Measuring Social Functions of City Regions from Large-scale Taxi Behaviors", IEEE International Conference on Pervasive Computing and Communications Workshops, Mar. 2011, 5 pages.
Rousseeuw, "Silhouettes: a graphical aid to the interpretation and validation of cluster analysis", Journal of Computational and Applied Mathematics, vol. 20, Nov. 1987, pp. 53-65.
Vatsavai, et al., "Machine Learning Approaches for High-resolution Urban Land Cover Classification: A Comparative Study", Proceedings of the 2nd International Conference on Computing for Geospatial Research and Applications, May 2011, 10 pages.
Yin, et al., "Geographical Topic Discovery and Comparison", WWW2011, Proceedings of the 20th International Conference on the World Wide Web, Mar.-Apr. 2011, 10 pages.
Yuan, et al., "Driving with Knowledge from the Physical World", KDD'11, Proceedings of the 17th ACM SIGKKD International Conference on Knowledge Discovery and Data Mining, Aug. 2011, 9 pages.
Yuan, et al., "Where to Find My Next Passenger?", UbiComp'11, Proceedings of the 13th International Conference on Ubiquitous Computing, Sep. 2011, 10 pages.
Zhang, et al., "Mining the Semantics of Origin-Destination Flows using Taxi Traces", UbiComp'12, Proceedings of the 2012 ACM Conference on Ubiquitous Computing, Sep. 2012, 7 pages.
Zheng, et al., "Urban Computing with Taxicabs", UbiComp'11, Proceedings of the 13th International Conference on Ubiquitous Computing, Sep. 2011, 10 pages.

* cited by examiner

DISCOVERING FUNCTIONAL GROUPS OF AN AREA

BACKGROUND

Urbanization fosters functional diversification across different districts or sections within a city or other area. For example, as a city develops, the formation of educational districts, business districts, and residential districts occurs. These districts, which are spread across the city, make up functional groups because each serves a different primary function for serving the people that live in the city. Whether they were designed by urban planners, or naturally formed during the course of urbanization, these functional groups will continue to evolve as lifestyles change and as a city continues to grow.

Discovering functional groups can enable a variety of valuable applications. For example, it can serve as a valuable organizational framework to give people a quick understanding of a complex area (e.g., New York City, Tokyo, Paris, etc.), which leads to useful applications such as social recommendations, travel planning, and the like. Both local citizens and visitors may find such information useful in navigating a city. In addition, urban planners can also use information about functional groups for calibrating urban planning as a form of feedback mechanism that allows for adjustments to be made in future urban planning of cities that do not develop quite as planned. Entrepreneurs and business owners can also leverage information about functional groups for choosing a location for a new business, and/or choosing where to advertise for their business. For example, a location's a distance from a district having a particular function (e.g., residential districts) may be a factor in choosing the location for a business.

The task of discovering functional groups is not a trivial endeavor. Prior attempts have considered information about an area in isolation to infer the functionality of districts or sections within the area. For instance, points of interest (POIs) may be indicative of the function of a district, but they are not sufficient when considered in isolation due to the compound functional nature of districts that often comprise a variety of different POIs (e.g., restaurants, universities, historical sites, etc.). Accordingly, current techniques for discovering functional groups are insufficient for the aforementioned applications.

SUMMARY

Described herein are techniques and systems for discovering functional groups within an area (e.g., a city, county, etc.) using both mobility patterns among the districts or sections and points of interest (POIs) located in the districts or sections. The sections having different functions are grouped according to function, the resulting groups are referred to herein as "functional groups."

In some embodiments, a process of discovering functional groups of an area includes segmenting a map of the area into sections, and inferring, for each section, a distribution of functions according to a topic model framework which uses mobility patterns of users leaving from and arriving at the section and considers points of interest (POIs) in the section. The topic model framework uses the section as a document, each function of the section as a topic of the document, the mobility patterns as words, and a POI feature vector for the section as metadata associated with the document. As a result, each section may be represented by a distribution of functions ("function distribution"), and a function is featured by a distribution of mobility patterns.

In some embodiments, the process further includes clustering or grouping the sections based at least in part on a similarity between the function distributions of each of the sections to obtain groups of sections which correspond to the functional groups. An intensity of each function ("functionality intensity") for each of the functional groups may be estimated, and each of the functional groups may be annotated on a visual representation of the area to provide an understanding of the functionality of each functional group. In some embodiments, a functional group is determined by aggregating sections having the same or similar functions. In some embodiments, the functionality intensity is based at least in part on the mobility patterns among the sections. Other embodiments will become more apparent from the following detailed description when taken in conjunction with the accompanying drawings.

Utilizing a topic model-based framework which considers both mobility patterns and POIs in the determination of an area's functional groups enables smart cities through urban computing, and provides a firm understanding of urban dynamics. This understanding is useful in a variety of applications.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicates similar or identical items.

DETAILED DESCRIPTION

Embodiments of the present disclosure are directed to, among other things, techniques and systems to discover functional groups in an area using both mobility patterns among sections of the area and points of interest (POIs) located in the sections. Embodiments disclosed herein find particular application for urban planning. However, it is to be appreciated that the disclosed embodiments may also be utilized for other applications, including business location planning, advertisement planning, social recommendations, or tourism services like electronic map services, to name only a few.

The techniques and systems disclosed herein utilize a topic model-based framework for inferring function distributions of each section of an area (e.g., a city, a county, etc.). A section may include a district, a neighborhood, or other subdivision of an area. Accordingly, both mobility patterns and POIs may be considered together in such a way that an accurate representation of functional distributions of the sections may be generated and used to determine functional groups of the area. Accordingly, the functional groups are made up of one or more sections that are grouped together based on a comparison of their function distributions. Further, by estimating a functionality intensity for each function, the compound nature of functions within each section may be accounted for, and urban dynamics of the area may be firmly understood.

The techniques and systems described herein may be implemented in a number of ways. Example implementations are provided below with reference to the following figures.

Example Architecture

Figure 1:
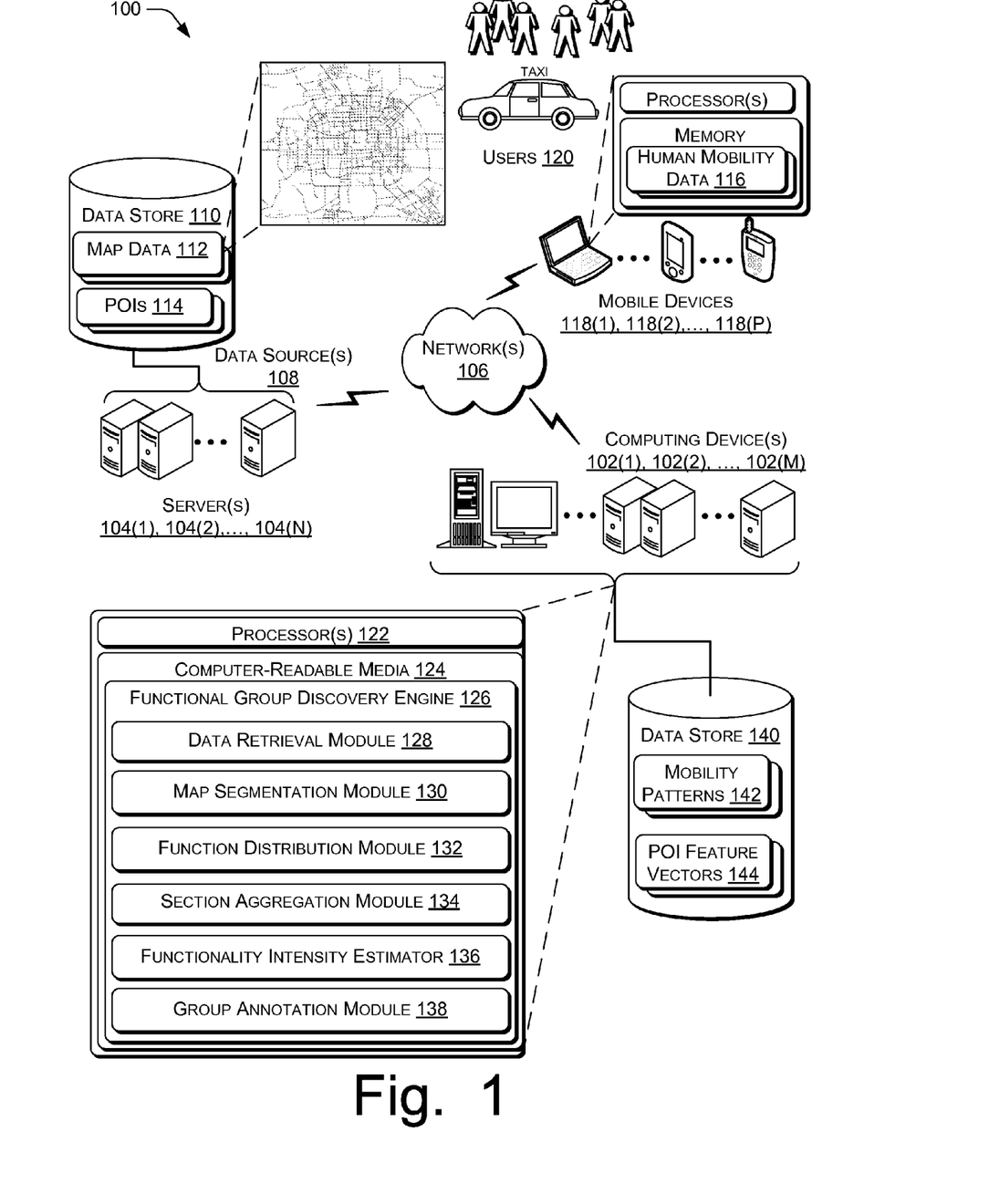
FIG. 1 illustrates an example architecture for discovering functional groups in an area using both mobility patterns among sections of the area and points of interest (POIs) located in the sections.

FIG. 1 illustrates an example architecture 100 for discovering functional groups in an area using both mobility patterns among sections and points of interest (POIs) located in the sections according to a topic model-based framework.

The architecture 100 may include one or more computing devices 102(1), 102(2) . . . , 102(M) configured to discover functional groups. The computing devices 102(1)-(M) may be implemented as any number of computing devices, including personal computers, laptop computers, portable digital assistants (PDAs), mobile phones, tablet computers, set-top boxes, game consoles, and so forth. In some embodiments, the computing devices 102(1)-(M) may comprise multiple computing devices arranged in a data center, server farm or a server cluster, allowing for interaction with data generated and provided by the computing devices 102(1)-(M).

The computing devices 102(1)-(M) may access one or more servers 104(1), 104(2) . . . , 104(N) via one or more networks 106. The network(s) 106 is representative of many different types of networks, such as cable networks, the Internet, local area networks, mobile telephone networks, wide area networks and wireless networks, or a combination of such networks. The server(s) 104(1)-(N) may be operated and controlled by one or more data sources 108 which provides, or otherwise grants access to, data stored in a data store 110 via the network(s) 106. The data provided by the data source(s) 108, and stored in the data store 110, may include, but is not limited to, map data 112 and points of interest (POIs) 114. It is to be appreciated that the data source(s) 108 may provide other types of data in addition to the map data 112 and POIs 114.

The map data 112 may comprise any suitable information regarding the geography, geographical features and/or territorial borders of an area, such as a city. Geographical features in the map data 112 may include road networks comprising major roads (e.g., highways, urban expressways, and the like). A road network database may categorize roads into different levels (e.g., level 0—highways, level 1—expressways, level 2—arterial roads) depending on the nature and primary use of the road. Road networks naturally partition an urban area into portions, referred to herein as "sections" in some embodiments disclosed herein, and described in more detail below.

The points of interest (POIs) 114 are located throughout the area, and each POI 114 is associated with at least a coordinate (e.g., address, global positioning system (GPS) coordinate, latitude and longitude, etc.), an identifier (e.g., name, code, etc.), and a category or type (e.g., restaurant, shopping mall, etc.). A section usually includes a variety of POIs 114. As will be described in more detail below, the POIs 114 are indicative of the function of a section in an area such that a high frequency of a particular category of POI 114 in the section is indicative of the representative function of that section. However, due to the variety of POIs 114 in any given section, sections inherently comprise a compound functionality instead of a single-function distribution. Furthermore, there is no quality indicator with POIs 114 to differentiate among a set of POIs 114 in the same category in terms of quality, and POIs 114 further do not reflect the interactions between different sections in terms of human mobility, and as a result, two sections sharing a similar distribution of POIs 114 could still have different functions distributions.

Continuing with reference to FIG. 1, the computing devices 102(1)-(M) may further access human mobility data 116 captured by one or more mobile devices 118(1), 118(2) . . . , 118(P) via the network(s) 106. One or more users 120 are associated with the mobile devices 118(1)-(P). The users 120 may be individuals, groups of individuals, or any other suitable entity. In some cases, a user 120 may be represented by a vehicle, such as taxi cab, carrying one or more individuals. The movement of the users 120 among sections of an area is referred to herein as "human mobility." The ability to track human mobility is important because there is a strong correlation between human mobility and the functions of a section in an area. The time that individuals leave from/arrive at a section indicates the function of the section. For example, during a workday, people usually leave a residential area in the morning and return in the evening. The major time when people visit an entertainment area, however, is during the evening on workdays or anytime on non-workdays. Furthermore, the origin and destination sections describing human mobility can be correlated to reveal functionality. For example, people reaching an entertainment area a high probability of doing so from a working area during a workday, and from a residential area during a non-workday.

Human mobility may be tracked by the mobile devices 118(1)-(P) associated with the users 120. Accordingly, the mobile device 118(1)-(P) may be implemented as any number of computing devices which enable the capture and transmission of human mobility data 116, including a laptop computer, a PDA, a GPS device, a mobile phone, a tablet computer, portable game player, portable media player, and so forth. For example, a user 120 may be represented by a taxi cab carrying one or more individuals from a first section to a second section in an area, whereby the mobility patterns of the user 120 (i.e., when the user 120 leaves the first section and when the user 120 arrives at the second section) is tracked by a mobile device, such as the mobile device 118(2) comprising a GPS device mounted in the taxi cab. As another example, the mobility patterns of the user 120 may be obtained from the user 120 submitting posts (e.g., "check-ins," Geo-tweets®, geo-tagged photos, etc.) using location-based services, a social media website, or the like. Yet another way of tracking human mobility may be through obtaining cell-tower traces associated with a mobile device, such as the mobile device 118(P) comprising a mobile phone. Consent of the user(s) 120 may be obtained in some instances before human mobility data 116 is collected.

In some embodiments, each mobile device 118(1)-(P) is equipped with one or more processors and memory to store applications and data. A browser application is stored in the memory of the mobile devices 118(1)-(P) and executes on the one or more processors thereon to provide access to the computing devices 102(1)-(M) over the network(s) 106. This may arise in the situation where a user 120 is also a consumer of information generated by the computing devices 102(1)-(M), such as when the user 120 is an entrepreneur looking to choose a location for a new business. Accordingly, the browser renders a web application served by the computing devices 102(1)-(M) on an associated display. Although embodiments are described in the context of a web-based system, other types of client/server-based communications and associated application logic could be used.

It follows that the computing devices 102(1)-(M) are capable of handling requests, such as in the form of a uniform resource locator (URL), from many users 120 and serving, in response, various information and data, such as in the form of a web application, to the mobile devices 118(1)-(P), allowing the users 120 to interact with the data provided by the computing devices 102(1)-(M). In this manner, an entity which maintains and controls the computing devices 102(1)-(M) is representative of a service provider supporting user interaction, and may operate a site such as an informational site (e.g., a city government informational site), social media site, and so forth.

In one illustrative example, the computing devices 102(1)-(M) may be maintained and controlled by an urban planning entity that utilizes information generated through discovery of functional groups for purposes of calibrating urban planning for future urban development. In yet another example, a service provider may provide a subscription-based service for business owners who desire to access information from the service provider to help choose a location of a new or existing business.

As shown in FIG. 1, the computing devices 102(1)-(M) are equipped with one or more processors 122 and one or more forms of computer-readable media 124. A representative computing device and its various component parts will be described in more detail below with reference to FIG. 7. In general, the computer-readable media 124 may be used to store any number of functional, or executable, components, such as programs and program modules that are executable on the processor(s) 122 to be run as software. The components included in the computer-readable media 124 may include a functional group discovery engine 126 to discover groups of sections having different functions.

In some embodiments, the functional group discovery engine 126 includes one or more software application components such as a data retrieval module 128, a map segmentation module 130, a function distribution module 132, a section aggregation module 134, a functionality intensity estimator 136, and a group annotation module 138. The data retrieval module 128 is configured to access data from the server(s) 104(1)-(N), as well as the mobile devices 118(1)-(P), over the network(s) 106. The data obtained by the data retrieval module 128 may comprise the aforementioned map data 112, the POIs 114 and/or the human mobility data 116 to be further processed by downstream components of the functional group discovery engine 126. This data may be retrieved directly over the network(s) 106, or from a data store 140, or any combination thereof. For example, the data retrieval module 128 may retrieve the map data 112 from the data source(s) 108 via a local network transmission line or the Internet. In another example, the data retrieval module 128 may retrieve the data from a data store 140 which previously obtained and stored the data therein. The data store 140 may be local to the computing device(s) 102(1)-(M), or remote from the computing device(s) 102(1)-(M) (e.g., cloud storage).

The map segmentation module 130 is configured to receive the map data 112 in the form of an area map associated with an area of interest (e.g., an urban area, city, etc.) from the data retrieval module 128, and to segment the map into portions (referred to herein as "sections"). An illustrative technique for segmenting a map into sections is described in detail below with reference to FIG. 2. In general, any suitable process for segmenting a map of an area into sections may be utilized. For example, road networks offer a natural segmentation of an area into sections. However, it is to be appreciated that other techniques for segmenting a map into sections may be used, such as utilizing predetermined territorial boundaries determined by government agencies, or similar techniques.

The function distribution module 132 is configured to infer a function distribution of each section of the area using a topic model-based framework that considers both mobility patterns 142 determined from the human mobility data 116 and POIs feature vectors 144 obtained from the POIs 114 in the area. As a result, the function distribution module 132 is configured to represent each section by a distribution of functions, and each function by a distribution of mobility patterns 142. These mobility patterns 142 describe: (i) when a user 120 arrives at/leaves from a section, and (ii) where the user 120 arrives from/leaves to, and the mobility patterns 142 may be stored in the data store 140 and utilized by downstream components of the functional group discovery engine 126. The POI feature vectors 144 are associated with the sections and denote the frequency density for all POI categories within the associated section.

The topic model-based framework will be described in more detail below with reference to FIGS. 3-5. In general, the topic model framework is an analogy to a topic model used to discover topics of a document in a corpus of documents. In other words, the topic model-based framework for discovery of functional groups regards each section as a document, each function of the section as a topic of the document, human mobility patterns among the sections as words of the document, and POIs located in each section as metadata associated with the document.

After inferring the function distributions of the sections of the area according to the topic model-based framework, sections may be aggregated into clusters according to their function distributions by the section aggregation module 134. Accordingly, the section aggregation module 134 is configured to cluster sections based on a similarity between the function distributions of the sections, and to identify groups for each function.

The functionality intensity estimator 136 is configured to determine an intensity of each function ("functionality intensity") throughout the area based at least in part on the mobility patterns 142. In some embodiments, the functionality intensity estimator 136 uses a Kernel Density Estimation (KDE) technique to determine the functionality intensity, employing human mobility as samples.

The group annotation module 138 is configured to annotate a map of the area according to the functional groups. In some embodiments, the annotation carried out by the group annotation module 138 is a semi-manual process wherein factors including POI distributions, frequent mobility patterns 142, and functionality intensity are inputs to the semi-manual annotation process. The result is an annotated map of an area according to functional groups. This information may be stored, such as in the data store 140, and/or the information may be processed for output to the computing devices 102(1)-(M) and/or the mobile devices 118(1)-(P) on an associated display.

Example Map Segmentation

Figure 2A:
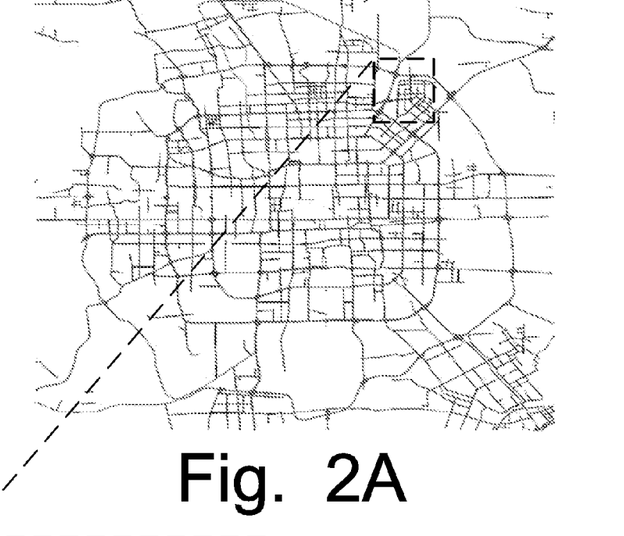
FIGS. 2A-2E illustrate an example technique for segmenting a map into sections.
Figure 2B:
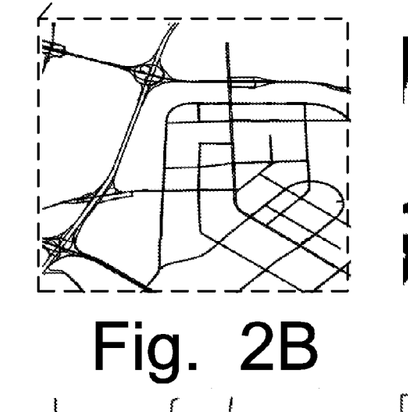

FIGS. 2A-2E illustrate an example technique for segmenting a map into sections. FIG. 2A shows a map of an area (e.g., a city), while FIG. 2B shows a close up of a sub-area of the map in FIG. 2A to illustrate an example map segmentation technique in greater detail. As mentioned above, road networks offer a natural segmentation of an area into sections. The road networks shown in FIGS. 2A and 2B comprise some major roads (e.g., highways, ring roads, etc.), as well as lesser traveled arterial roads. The different categories of roads may be associated with a road level (e.g., 0, 1, 2, etc.) and stored in a road network database and associated with the map data 112.

In some embodiments, the map of the area shown in FIG. 2A comprises a raster-based binary image (e.g., 0 indicates road segments, and 1 indicates blank space). A raster-based model may be advantageous for representing a road network map for use in map segmentation because it is computationally more efficient compared to alternative models, such as a vector-based model. It is to be appreciated, however, that other models for representing spatial data (e.g., map data 112) may be used, such as the vector-based model which uses geometric primitives like points, lines and polygons to represent spatial objects referenced by Cartesian coordinates. On one hand, vector-based models tend to be more powerful for precisely finding shortest-paths, for example, while on the other hand, they are more computationally intensive than raster-based models.

Figure 2C:
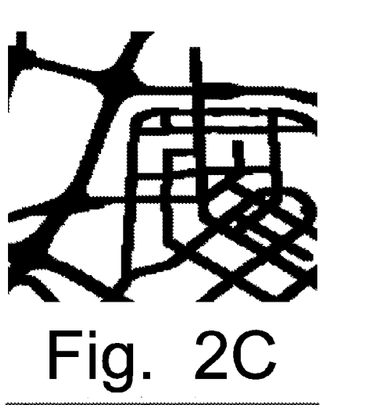
Figure 2D:
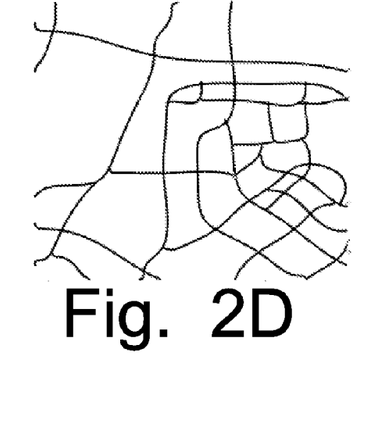
Figure 2E:
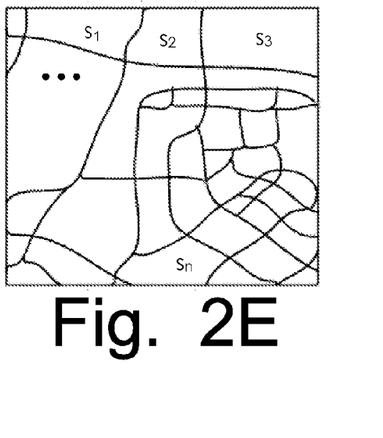

Accordingly, a raster-based model of a map of an area is shown in FIG. 2A as an example, where morphological image processing techniques may be used to segment the map as shown in FIGS. 2C-DE with reference to the zoomed sub-area of the map shown in FIG. 2B. Specifically, in order to remove any unnecessary details of the road network in FIG. 2B, such as lanes of a road, overpasses, etc., a dilation operation is performed to thicken the roads, as illustrated in FIG. 2C. This works to fill small holes and smooth out the unnecessary details of FIG. 2B. After the dilation operation, a thinning operation is performed to obtain a skeleton of the road network, as illustrated in FIG. 2D. Suitable algorithms used for thinning are known and should be apparent to a person having ordinary skill in the art. After the thinning operation, a connected component labeling (CCL) operation is performed to identify individual sections by clustering "1"-labeled grids, as shown in FIG. 2E. FIG. 2E shows sections labeled by respective labels $s_1, s_2, s_3, \ldots, s_n$, but, alternatively, colors, or any other suitable labeling scheme, may be used to label individual sections of FIG. 2E. Suitable techniques for CCL are known and should be apparent to a person having ordinary skill in the art. The result of the map segmentation technique illustrated by FIGS. 2B-2E is a map of the area that is now segmented into sections that are uniquely identified. Intrinsically, a section is a basic unit carrying socio-economic functions due to the following reasons. First, people live in sections, and POIs 114 fall in sections. Second, sections as the origin and destination of a trip are the root cause of human mobility. In short, people travel among sections.

The map segmentation technique discussed herein is generally discussed in terms of road networks and using a raster-based model of the road networks. However, other map segmentation techniques may be used without changing the basic characteristics of the system. For example, predefined territorial boundaries and/or a vector-based model may be used in the alternative to the example map segmentation technique disclosed herein.

Example Processes

Figure 3:
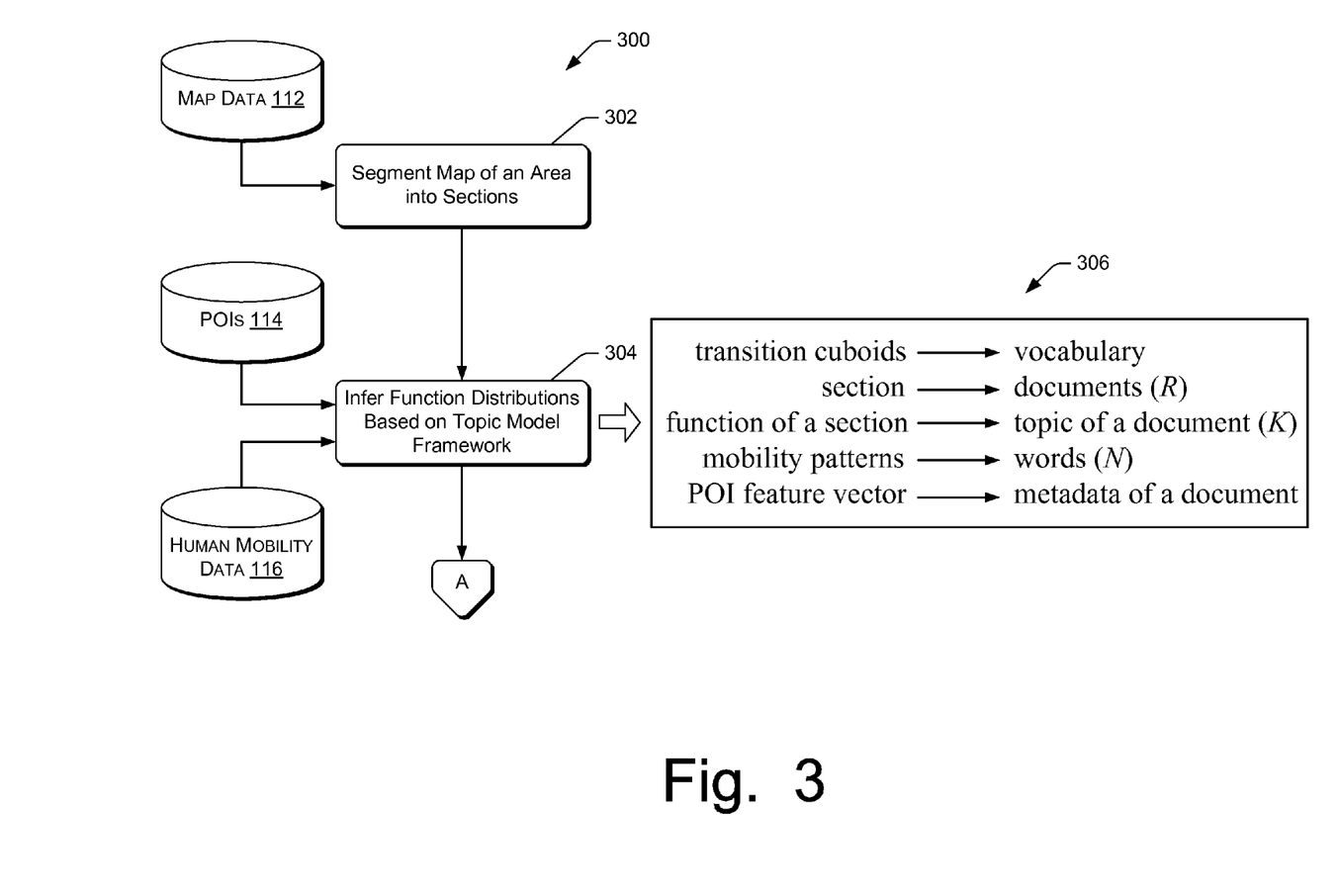
FIG. 3 is a flow diagram of an illustrative process to infer function distributions of sections based on a topic model framework which considers both mobility patterns and POIs.
Figure 4A:
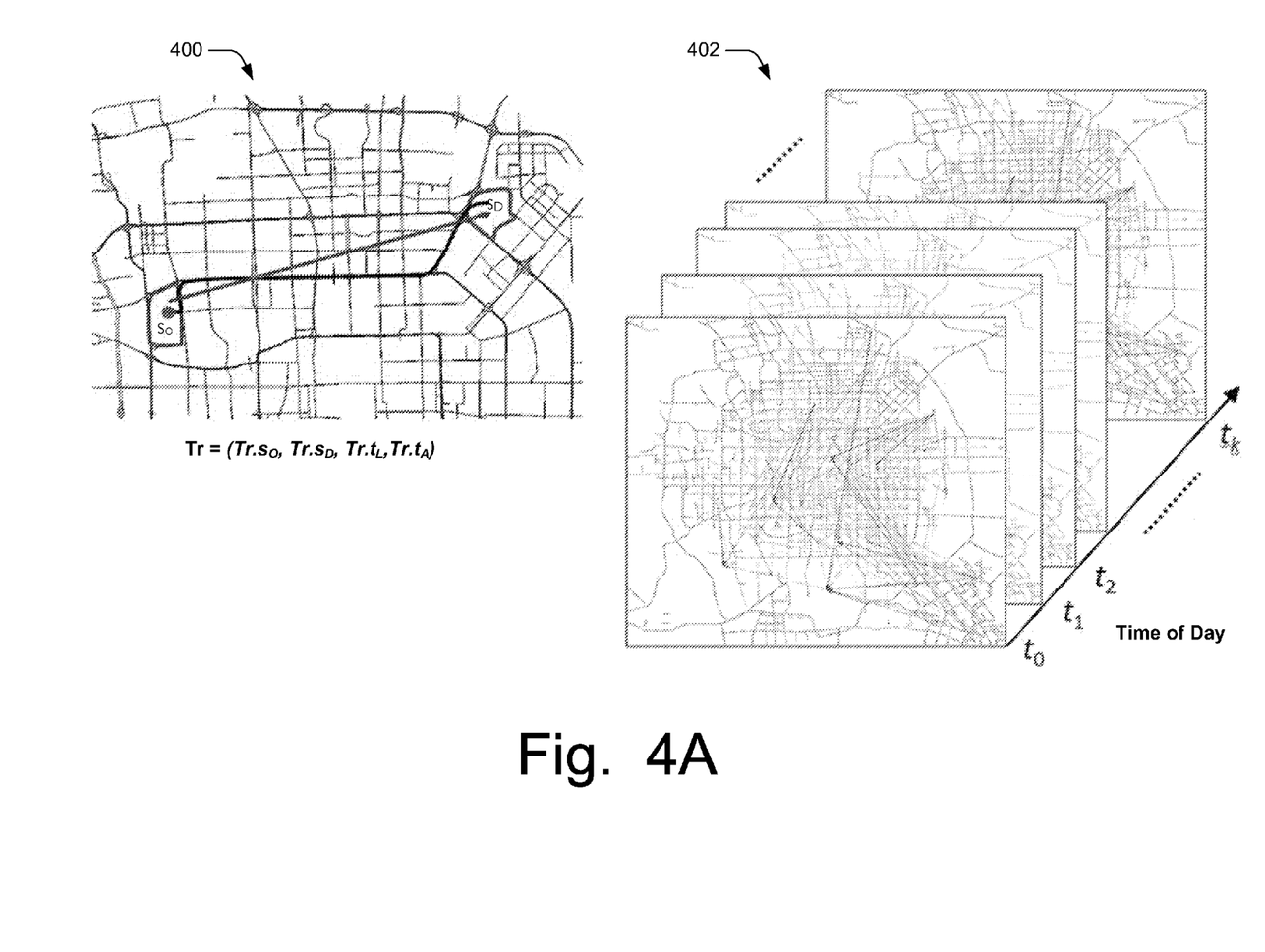
FIG. 4A is a pictorial diagram illustrating the concept of human mobility among sections of an area which is used in the disclosed embodiments.
Figure 6:
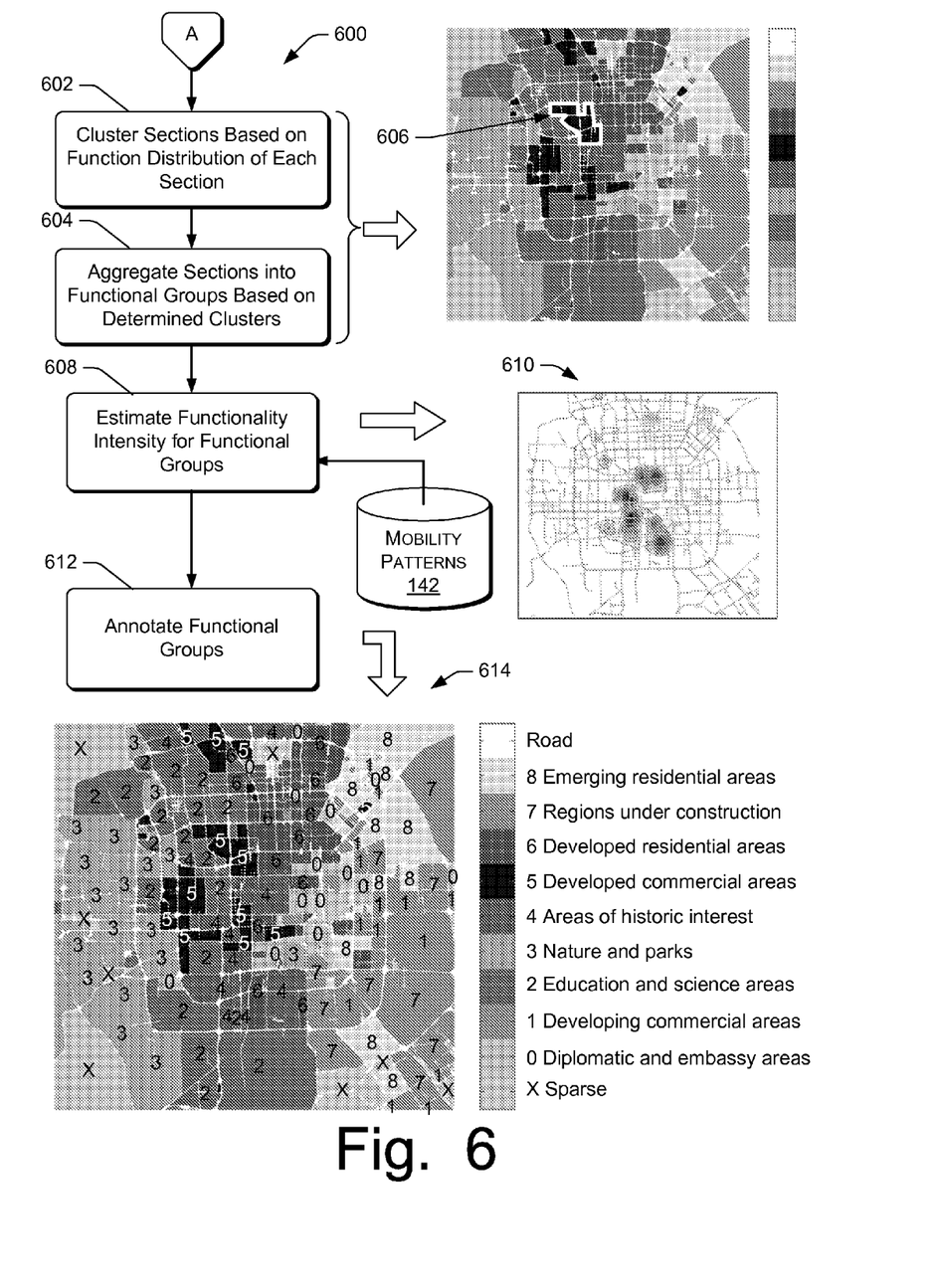
FIG. 6 is a flow diagram of an illustrative process for determining functional groups based on function distributions of the sections, and estimating an intensity of each function ("functionality intensity") throughout an area.

FIGS. 3 and 6 describe illustrative processes that are illustrated as a collection of blocks in a logical flow graph, which represents a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 3 is a flow diagram of an illustrative process 300 to infer function distributions of a set of sections of an area using mobility patterns 142 and POIs 114 according to a topic model framework. For discussion purposes, the process 300 is described with reference to the architecture 100 of FIG. 1, and specifically with reference to the data retrieval module 128, the map segmentation module 130 and the function distribution module 132 of the functional group discovery engine 126. The process 300 allows for each section of an area to be represented by a distribution of functions, and the functions to be featured by a distribution of mobility patterns.

At 302, a map of an area is segmented into sections. As described above, a suitable technique for segmenting a map into sections is the technique described with reference to FIG. 2 by representing a road network map as a raster-based map and utilizing morphological image processing techniques to segment the map into sections according to the road network. The map of an area is obtained from the map data 112 which may be retrieved by the data retrieval module 128 and input to the map segmentation module 130 at 302.

At 304, the function distribution module 132 infers function distributions for each section of the map based on a topic-model framework. For instance, an analogy chart 306 shows an example implementation of the topic model-based framework that may be used at 304 to infer function distributions for the sections of the map. The analogy chart 306 illustrates that the topic model framework regards each section as a document (R), each function of a section as a topic (K) of the document, human mobility patterns among the sections as words (N) of the documents, and POIs located in the sections as metadata associated with the documents. In other words, a section having multiple functions (i.e., a compound function distribution) can be likened to a document containing a variety of topics.

Probabilistic topic models have been successfully used for extracting the hidden thematic structure in large archives of documents. In such a topic model, each document of a corpus exhibits multiple topics and each word of a document supports a certain topic. Given all the words of each document in a corpus as observations, a topic model is trained to infer the hidden thematic structure behind the observations. Latent Dirichlet Allocation (LDA) is a generative model that includes hidden variables. The intuition behind this model is that documents are represented as random mixtures over latent topics, where each topic is characterized by a distribution over words. The basic LDA model could be a sufficient topic model-based framework for use in inferring function distributions of sections if only human mobility was to be considered. However, since the embodiments disclosed herein consider both POIs 114 and human mobility data 116, a more advance topic model framework, such as a topic model framework based on LDA and Dirichlet Multinomial Regression (DMR), is used herein for inferring function distributions of sections in an area. To better understand the DMR-based topic model, it is helpful to first describe how human mobility data 116 and POIs 114 are used as input for inferring function distributions at 304 based on mobility patterns 142 and POI feature vectors 144.

The process for determining the mobility patterns 142 from human mobility data 116 is explained with reference to FIG. 4A. Map 400 of FIG. 4A illustrates an example "transition" associated with a user 120. A "transition" Tr, as used herein, refers to a quaternion containing the following four data points: (i) origin section (Tr.$s_O$), (ii) leaving time (Tr.$t_L$), (iii) destination section (Tr.$s_D$), and (iv) arriving time (Tr.$t_A$). Tr.$s_O$ and Tr.$s_D$ are spatial features, while Tr.$t_L$ and Tr.$t_A$ are temporal features. For example, map 400 shows that a user 120 (e.g., a taxi cab carrying one or more individuals) travels from an origin section, $s_O$, to a destination section, $s_D$, where the user 120 leaves from $s_O$ at a leaving time, $t_L$, and arrives at $s_D$ at an arriving time, $t_A$. The human mobility data 116 for many users 120 is based on these types of transitions such that mobility patterns 142 may be generated from the human mobility data 116 including these transitions. "Mobility pattern" (M), as used herein, refers to a triple extracted from a transition. That is, given a transition Tr=(Tr.$s_O$, Tr.$s_D$, Tr.$t_L$, Tr.$t_A$), two mobility patterns may be obtained: a leaving mobility pattern $M_L$=(Tr.$s_O$, Tr.$s_D$, Tr.$t_L$), and an arriving mobility pattern $M_A$=(Tr.$s_O$, Tr.$s_D$, Tr.$t_A$).

Over a period of time, transition matrices representative of mobility patterns 142 for each section of an area may be generated at time intervals/bins over the period of time. For example, throughout the course of a day, users 120 travel between sections of an area. Accordingly, a time interval may be set at every two hours to generate a transition matrix for the sections of the area at each time bin of two hours. This would result in twelve transition matrices obtained throughout the course of a day that describe the mobility patterns 142 of the users 120 among the sections of the area. Diagram 402 of FIG. 4A illustrates how human mobility data 116 may be captured at time intervals $t_0, t_1, t_2, \ldots, t_k$ to obtain transition matrices representative of mobility patterns 142 at each interval $t_0$-$t_k$. These transition matrices may be used to construct transition cuboids representative of mobility patterns 142 of the users 120 among sections of an area over a period of time.

Figure 4B:
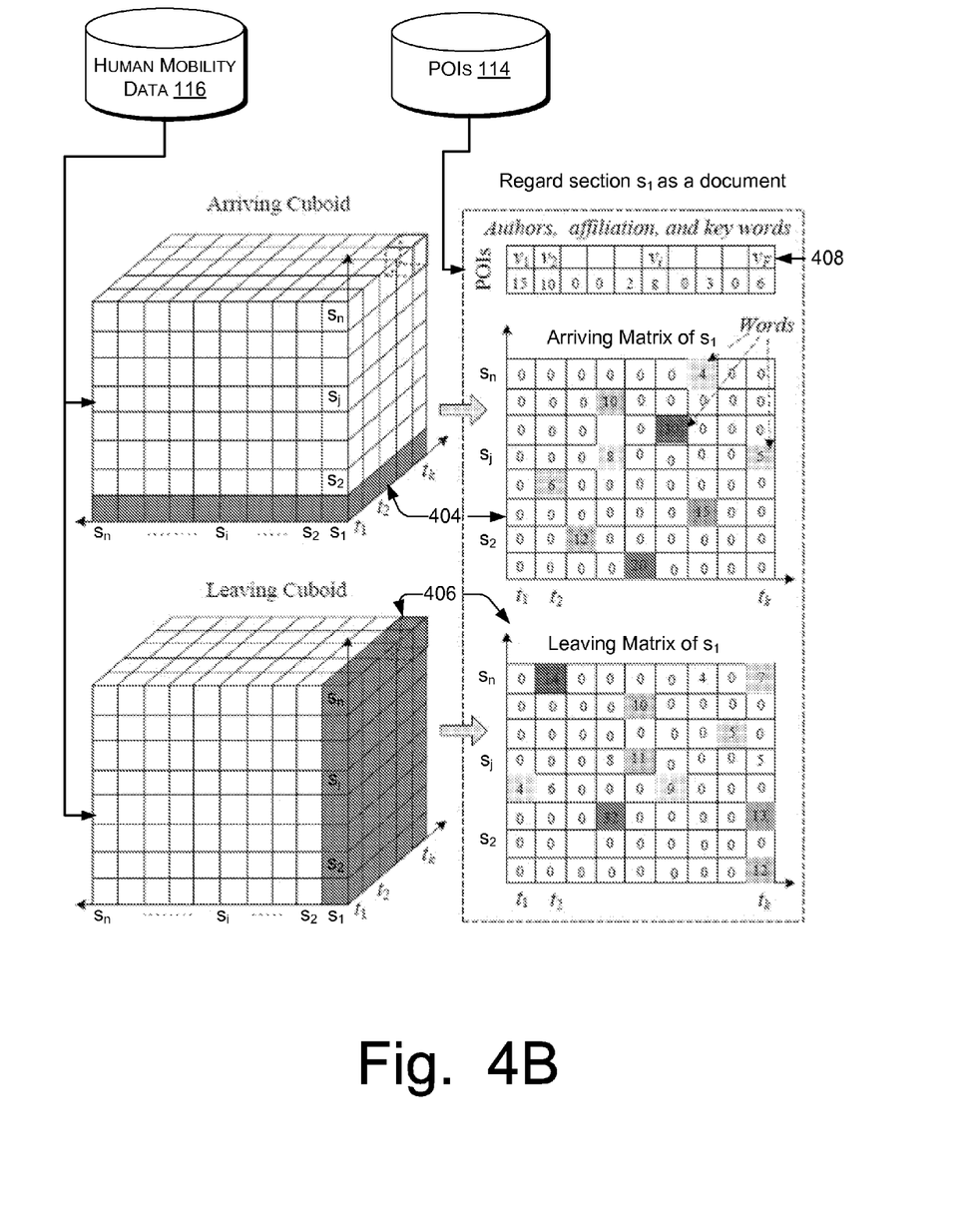
FIG. 4B is an example of two transition cuboids representing frequency of mobility patterns associated with sections, the transition cuboids being used to generate a document representation of a section in conjunction with a POI feature vector.

FIG. 4B is a diagram illustrating two transition cuboids (i.e., an arriving cuboid and a leaving cuboid), which may be used for representing a section as a document based on a topic model-based framework. A "transition cuboid" (C), as used herein, refers to an S×S×T cuboid where S is the number of sections in the area, and T is the number of time intervals/bins. Since there are two types of mobility patters (i.e., a leaving mobility pattern $M_L$=(Tr.$s_O$, Tr.$s_D$, Tr.$t_L$), and an arriving mobility pattern $M_A$=(Tr.$s_O$, Tr.$s_D$, Tr.$t_A$)), a leaving cuboid $C_L$ may be described by the following:

$$C_L(i,j,k)=\|\{M_L=(x,y,z)|x=s_i,y=s_j,z=t_k\}\| \quad (1)$$

Similarly, an arriving cuboid $C_A$ may be described by the following:

$$C_A(i,j,k)=\|\{M_A=(x,y,z)|x=s_i,y=s_j,z=t_k\}\| \quad (2)$$

Here, the value in the cell with index (i, j, k) of the leaving cuboid indicates the number of mobility patterns 142 that leave from section s, for section $s_j$ at time $t_k$. Similarly, the value in the cell with index (i, j, k) of the arriving cuboid indicates the number of mobility patterns 142 that arrive at section $s_i$ from section $s_j$ at time $t_k$.

For a specific section $s_i$, the mobility patterns associated with $s_i$ are represented by two "slices" (i.e., matrices) from the arriving cuboid and the leaving cuboid. Accordingly, an arriving matrix 404 and a leaving matrix 406 may be represented respectively as: $C_A$ (1:S, i, 1:T) and $C_L$ (i, 1:S, 1:T). As shown in FIG. 4B, a "document" representation of the section $s_i$ may, in part, be comprised of the arriving matrix 404 and the leaving matrix 406 associated with section $s_i$; obtained from the arriving and leaving cuboids, respectively. Each cell of the matrices 404 and 406 represents a specific mobility pattern 142, and the value of each cell indicates the occurrences of those mobility patterns 142. For example, in the right-most column of the arriving matrix 404, the cell containing "5" indicates that, on average, the mobility pattern 142 that describes a user 120 going to $s_i$ from $s_j$ in time bin $t_k$ occurred 5 times per day. The mobility patterns 142 (i.e., the cells) correspond to the words of the document in the topic-model based framework, and the values of each cell correspond to the occurrences of those words in the document.

In some embodiments, the function distribution module 132 is further configured to determine one or more representative mobility patterns 142 for a section using a term frequency-inverse document frequency (TF-IDF) technique. TF-IDF is a numerical statistic which will reflect how relevant a particular mobility pattern 142 is to a section in a set of sections, and may be used as a weighting factor to determine one or more representative mobility patterns 142 for a section. The TF-IDF value will increase proportionally to the number of times a mobility pattern 142 occurs in a section, but is offset by the frequency of the mobility pattern 142 in the set of sections, which allows for control of the fact that some mobility patterns 142 are generally more common than others across the area containing the sections. Term frequency (TF) looks at the frequency of a mobility pattern 142 (i.e., one of the cells of a transition matrix) for a given section. It is to be appreciated that any specific TF methodology may be used, such as using raw frequencies, Boolean frequencies, logarithmically scaled frequencies, or normalized frequencies which prevents a bias toward perhaps larger sections with more mobility patterns 142 in general. Meanwhile, the inverse document frequency (IDF) factor will diminish the weight of mobility patterns 142 that occur very frequently across the set of sections in the area, and will increase the weight of mobility patterns 142 that occur infrequently across the set of sections in the area. In some embodiments, the IDF factor is determined by dividing the total number of sections in the area by the number of sections containing a particular mobility pattern 142, and then taking the logarithm of that quotient. The TF-IDF value is then calculated as the product of the TF statistic and the IDF factor. As a result, the most representative mobility patterns 142 for a section will be those that occur more frequently in that section, but that occur infrequently throughout the rest of the area. It is to be appreciated that other suitable techniques may be used as an alternative to TF-IDF to determine more relevant mobility patterns 142.

In addition to mobility patterns 142, the DMR-based topic model also allows for consideration of POIs 114 for inferring functional distributions of the sections of an area. In some embodiments, a POI 114 is recorded as a tuple (in a POI database) including a POI category, a name/code, and an address/geo-position (i.e., latitude, longitude). An example list of POIs 114 is provided below in Table 1.

TABLE 1

POI category taxonomy

| Code | POI category |
|---|---|
| 1 | Car service |
| 2 | Car sales |
| 3 | Car repair |
| 4 | Motorcycle service |
| 5 | Cafe/Tea bar |
| 6 | Sports/stationary shop |
| 7 | Living service |
| 8 | Sports |
| 9 | Hospital |
| 10 | Hotel |
| 11 | Scenic spot |
| 12 | Residence |
| 13 | Governmental agencies and public organizations |
| 14 | Science and education |
| 15 | Transportation facilities |
| 16 | Banking and insurance service |
| 17 | Corporate business |
| 18 | Street furniture |
| 19 | Entrance/bridge |
| 20 | Public utilities |
| 21 | Chinese restaurant |
| 22 | Foreign restaurant |
| 23 | Fast food restaurant |
| 24 | Shopping mall |
| 25 | Convenience store |
| 26 | Electronic products store |
| 27 | Supermarket |
| 28 | Furniture building materials market |
| 29 | Pub/bar |
| 30 | Theaters |

For each section s, the number of POIs in each POI category can be counted. The frequency density $v_i$ of the ith POI category in s is calculated by Equation (3):

$$v_i = \frac{\text{Number of the POIs of the ith POI category}}{\text{Area of section } s(\text{measured by grid-cells})} \quad (3)$$

The POI feature vector of s is denoted by $x_s=(v_1, v_2, \ldots, v_F, 1)$, where F is the number of POI categories and the last "1" is a default feature to account for the mean value of each function. As illustrated in FIG. 4B, the POI feature vector 408 (144 in FIG. 1) is regarded as the metadata of each section in the topic model-based framework, which corresponds to metadata for a document such as author, email, and institution.

Given the mobility patterns 142 (e.g., transition matrices), and the POI feature vectors 144, the DMR-based topic model may be used to infer function distributions for the sections of an area at 304 of the process 300 in FIG. 3. Thus, the DMR-based topic model, as disclosed herein, takes into account the influence of the observable metadata (i.e., POI feature vectors 144), and is known to be more computationally efficient and succinct in implementation as compared to other models such as an Author-Topic model or Topic-Over-Time model used for topic discovery in documents.

Figure 5:
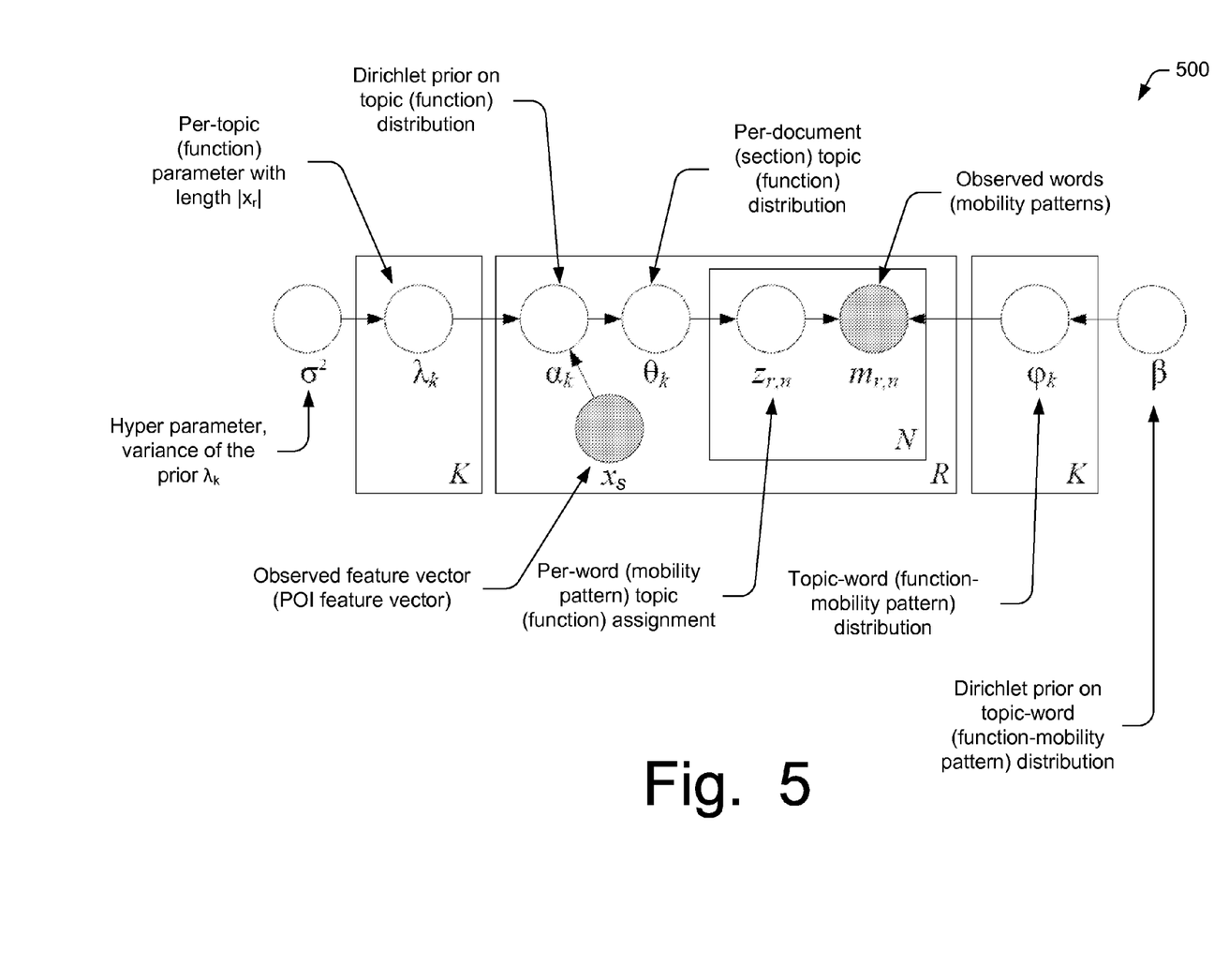
FIG. 5 is a pictorial diagram illustrating a Dirichlet Multinomial Regression (DMR)-based topic model.

FIG. 5 is a pictorial diagram illustrating the generative process of the DMR-based topic model 500. In the DMR-based topic model 500, each blank circle denotes a hidden variable, each arrow denotes a probabilistic dependence, and N is the number of mobility patterns (words), R is the number of sections (documents), and K is the number of functions (topics). With reference to the DMR model 500 of FIG. 5, the generative process of the DMR model 500 may be described as follows:

1. For each section function k,
   a) draw $\lambda_k \sim \mathcal{N}(0, \sigma^2 I)$;
   b) draw $\beta_k \sim \text{Dir}(\eta)$;
2. Given the rth section,
   a) for each section function k, let $\alpha_{r,k}=\exp(x_r^T \lambda_k)$;
   b) draw $\theta_r \sim \text{Dir}(\alpha_r)$;
   c) for the nth mobility pattern in the rth section $m_{r,n}$,
     i. draw $z_{r,n} \sim \text{Mult}(\theta_r)$;
     ii. draw $m_{r,n} \text{Mult}(\beta z_{r,n})$.

Here, $\mathcal{N}$ is the Gaussian distribution with σ as a hyper parameter, and $\lambda_k$ is a vector with the same length as the POI feature vector. The nth observed mobility pattern of section s is denoted as $m_{r,n}$. Other notations are similar to the basic LDA model. The DMR-based topic model can also be estimated using expectation-maximization (EM) and inferred using Gibbs sampling. Different from the basic LDA model, here, the Dirichlet prior α is now specified to individual sections ($\alpha_r$) based on the observed POI features of each section. Therefore, for different combinations of POI category distributions, the resulting α values are distinct. Thus, the thematic section function distributions extracted from the data are induced by both the POI features vectors 144 and mobility patterns 142. As a result, by applying the DMR-based topic model, given the mobility patterns 142 and POI feature vectors 144, the function distribution for each section may be determined, and the mobility pattern distribution of each function may also be determined.

FIG. 6 is a flow diagram of an illustrative process 600 for determining functional groups based on function distributions of the sections, and estimating an intensity of each function ("functionality intensity") throughout an area. The illustrative process 600 may continue from the process 300 of FIG. 3 as denoted by the "A" designator. For discussion purposes, the process 600 is described with reference to the architecture 100 of FIG. 1, and specifically with reference to the section aggregation module 134, the functionality intensity estimator 136, and the group annotation module 138 of the functional group discovery engine 126.

At 602, the section aggregation module 134 clusters or otherwise groups sections according to the function distribution determined for each section. Sections may be clustered or grouped by any suitable clustering technique. This clustering process results in sections from the same cluster having similar functions or function distributions, wherein the different clusters represent different "functional groups." In some embodiments, a k-means clustering algorithm is used to cluster the sections of an area according to the function distribution determined by the function distribution module 132. For example, for a section s, after parameter estimations are made based on the DMR-based topic model, the function distribution may be represented as a K-dimensional vector $\theta_r=(\theta_{r,1}, \theta_{r,2}, \ldots, \theta_{r,K})$, where $\theta_{r,k}$ is a proportion of function k for section s. The sections may then be clustered using a k-means clustering technique on the K-dimensional points $\theta_r$, r∈1, 2, ..., R. The number of clusters can be predefined according to the needs of an application or determined using the average silhouette value as the criterion. The silhouette value of a point i in the dataset, denoted by s(i) is in the range of [−1, 1], where s(i) close to 1 means that the point is appropriately clustered and very distant from its neighboring clusters, s(i) close to 0 indicates that the point is not distinctly in one cluster or another, s(i) close to −1 means the point is likely assigned to the wrong cluster. The average silhouette value of a cluster measures how tightly the data in the cluster are grouped, and the average silhouette of the entire dataset reflects how appropriately all the data has been clustered. In some embodiments, cross validation on the dataset for a different k may be performed multiple times, where an appropriate k with the maximum overall silhouette value may be chosen. Consequently, the sections are aggregated into k clusters, each of which is termed a functional group.

At 604, the section aggregation module 134 aggregates sections within each cluster and identifies the aggregated sections as a group for the respective functions. The cluster of sections 606 shown in FIG. 6 is an example of a portion of a functional group resulting from steps 602 and 604 of the process 600.

At 608, the functionality intensity estimator 136 determines the intensity of each function ("functionality intensity") throughout the area based at least in part on the mobility patterns 142 among the functional groups. Mobility patterns 142 are considered in 608 primarily due to the fact that the functionality of a functional group is generally not uniformly distributed within the entire functional group, and sometimes the core functionality of a functional group spans multiple sections, leading to a functional group with an irregular shape. For example, a popular shopping street may cross several sections. In order to reveal the degree of functionality and determine the group of a plurality of functional sections, the functionality intensity may be estimated for each functional group.

In some embodiments, a Kernel Density Estimation (KDE) model is used to infer the functionality intensity in a functional group using the mobility patterns 142. Specifically, the origin and destination of each mobility pattern (e.g., latitude and longitude) is input into the KDE model for use in estimating the functionality intensity in a functional group. Mobility patterns 142 are used because they reflect the functionality intensity in terms of popularity of a functional group, where the number of visits from users 120 indicates the popularity of the functional group. It is to be appreciated that the destinations obtained from the mobility patterns 142 may be an estimate of the actual location that an individual arrives at during a transition. However, the destinations obtained for the mobility patterns 142 should provide a sufficient data point for purposes of determining functionality intensity because the likelihood that an individual would visit a location is inversely proportional to the distance from the location to the destination of a mobility pattern 142 (i.e., most people would not have a taxi drop them off at a destination point that is very far from a final location they want to visit).

Given n points $x_1, x_2, \ldots, x_n$ located in a two-dimensional space, KDE estimates the intensity at location s by a kernel density estimator, defined as Equation (4):

$$\lambda(s) = \sum_{i=1}^{n} \frac{1}{nr^2} K\left(\frac{d_{i,s}}{r}\right) \quad (4)$$

Here, $d_{i,s}$ is the distance from $x_i$ to s, r is the bandwidth and K(•) is the kernel function whose value decays with the increasing of $d_{i,r}$, such as the Gaussian function, Quartic function, Conic and negative exponential. The choice of the bandwidth usually determines the smoothness of the estimated density—a large r achieves smoother estimation while a small r reveals more detailed peaks and valleys. In this case, the Gaussian function may be chosen as the kernel function in Equation (5), i.e.:

$$K\left(\frac{d_{i,s}}{r}\right) = \frac{1}{\sqrt{2\pi}} \exp\left(-\frac{d_{i,s}^2}{2r^2}\right) \quad (5)$$

Here, the bandwidth r is determined according to mean integrated square error (MISE) criterion.

A functionality intensity map 610 is shown in FIG. 6 to illustrate how the estimated functionality intensity corresponds to the sections on the map. The functionality intensity map 610 is essentially a gradient map showing the density in terms of the area for a particular functional group.

At 612, the group annotation module 138 annotates the functional groups with semantic terms according to the function distribution and functionality intensity. Semantic terms help with an understanding of the functions of each functional group. In some embodiments, the annotation performed at 612 is a semi-manual process which considers the following major aspects: (i) the POI configuration in a functional group, (ii) the most frequent mobility patterns 142 of each functional group, (iii) the functionality intensity, and/or (iv) human-labeled sections (i.e., human-labeling of well-known sections or districts). Consideration of (i) the POI configuration comprises computing an average POI feature vector 144 across the sections within a functional group, and then ranking each POI category within the functional group according to the average frequency density in the average POI feature vector 144 calculated for that functional group. The functional groups of the area may then be ranked for each POI category. Consideration of (iii) the functionality intensity comprises studying the representative POIs 114 located within each functionality kernel.

The annotation may be rendered on a map, such as the map used for segmentation into sections, or any suitable visual representation of the area. An example annotated map 614 is shown in FIG. 6 which may result from the annotation of functional groups at 612. Although the annotated map 614 shows eight specific annotations, more or less annotations may be chosen depending on the specific application and area being analyzed. Colors may be used to denote the different functional groups, where the colors correspond to the most representative function of the sections within a functional group. In this sense, the annotation for each functional group does not mean that the functional group or the sections within the functional group to not have other functions. Often it is the case that functional groups, and even sections have compound functionality. Other labeling schemes may also be utilized without departing from the basic characteristics of the system disclosed herein.

Example Computing Device

Figure 7:
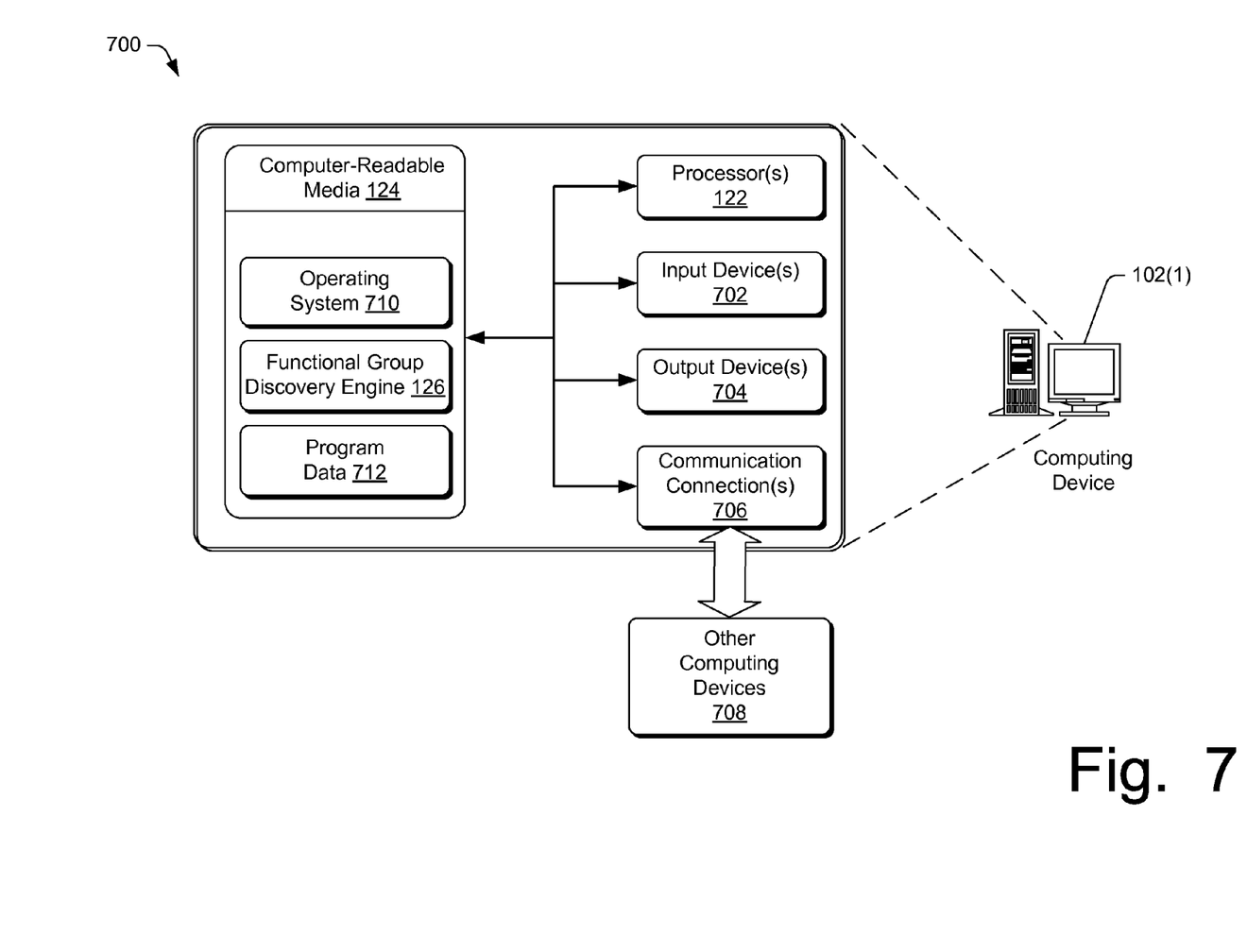
FIG. 7 is a block diagram that illustrates a representative computer system that may be configured to discover functional groups.

FIG. 7 illustrates a representative system 700 that may be used to implement the functional group discovery engine 126. However, it is to be appreciated that the techniques and mechanisms may be implemented in other systems, computing devices, and environments. The representative system 700 may include one or more of the computing devices 102(1)-(M) of FIG. 1. However, the computing device 102(1) shown in FIG. 7 is only one illustrative of a computing device and is not intended to suggest any limitation as to the scope of use or functionality of the computer and network architectures. Neither should the computing device 102(1) be interpreted as having any dependency nor requirement relating to any one or combination of components illustrated in the representative system 700.

The computing device 102(1) may be operable to discover functional groups according to the embodiments disclosed herein. For instance, the computing device 102(1) may be configured to segment an area map into sections, infer function distributions of the sections based on a topic model framework, cluster sections into functional groups, aggregate sections into groups, estimate functionality intensity of the functional groups, and annotate the functional groups, among other things.

In at least one configuration, the computing device 102(1) comprises the one or more processors 122 and computer-readable media 124 described with reference to FIG. 1. The computing device 102(1) may also include one or more input devices 702 and one or more output devices 704. The input devices 702 may be a keyboard, mouse, pen, voice input device, touch input device, etc., and the output devices 704 may be a display, speakers, printer, etc. coupled communicatively to the processor(s) 122 and the computer-readable media 124. The computing device 102(1) may also contain communications connection(s) 706 that allow the computing device 102(1) to communicate with other computing devices 708 such as via a network. The other computing devices 708 may include the mobile devices 118(1)-(P) and/or the server(s) 104(1)-(N) of FIG. 1.

The computing device 102(1) may have additional features and/or functionality. For example, the computing device 102(1) may also include additional data storage devices (removable and/or non-removable) such as, for example, magnetic disks, optical disks, or tape. Such additional storage may include removable storage and/or non-removable storage. Computer-readable media 124 may include, at least, two types of computer-readable media 124, namely computer storage media and communication media. Computer storage media may include volatile and non-volatile, removable, and non-removable media implemented in any method or technology for storage of information, such as computer readable instructions, data structures, program modules, or other data. The system memory, the removable storage and the non-removable storage are all examples of computer storage media. Computer storage media includes, but is not limited to, random access memory (RAM), read-only memory (ROM), erasable programmable read-only memory (EEPROM), flash memory or other memory technology, compact disc read-only memory (CD-ROM), digital versatile disks (DVD), or other optical storage, magnetic cassettes, magnetic tape, magnetic disk storage or other magnetic storage devices, or any other non-transmission medium that can be used to store the desired information and which can be accessed by the computing device 102. Any such computer storage media may be part of the computing device 102. Moreover, the computer-readable media 124 may include computer-executable instructions that, when executed by the processor(s) 122, perform various functions and/or operations described herein.

In contrast, communication media may embody computer-readable instructions, data structures, program modules, or other data in a modulated data signal, such as a carrier wave, or other transmission mechanism. As defined herein, computer storage media does not include communication media.

The computer-readable media 124 of the computing device 102(1) may store an operating system 710, the functional group discovery engine 126, and may include program data 712.

As described above, the functional group discovery engine 126 may discover functional groups (i.e., clusters of section with similar functions) using the processes and techniques illustrated in FIGS. 3-6. For instance, the functional group discovery engine 126 may enable the computing device 102(1) to segment an area map into sections, infer function distributions of the sections based on a topic model framework, cluster sections into functional groups, aggregate sections into groups, estimate functionality intensity of the functional groups, and annotate the functional groups, among other things.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:
1. A system comprising:
one or more processors;
memory;
a map segmentation module maintained in the memory and executable by the one or more processors to segment a map of an area into a set of sections;
a function distribution module maintained in the memory and executable by the one or more processors to infer a distribution of functions for each section in the set of sections according to a topic model framework which uses mobility patterns of users leaving from and arriving at each section and uses points of interest (POIs) in each section;
a section aggregation module maintained in the memory and executable by the one or more processors to group sections of the set of sections based at least in part on a similarity of the distribution of functions between each section to create functional groups;
a functionality intensity estimator maintained in the memory and executable by the one or more processors to estimate a functionality intensity for each of the functional groups; and a group annotation module maintained in the memory and executable by the one or more processors to annotate each of the functional groups on a visual representation of the area.

2. The system of claim 1, wherein the topic model framework is a Dirichlet Multinomial Regression (DMR)-based topic model.

3. The system of claim 1, wherein the topic model framework stores a point of interest (POI) feature vector associated with the POIs in each section as metadata.

4. The system of claim 3, wherein the POI feature vector for each section is based at least in part on frequency densities of different types of POIs in each section.

5. The system of claim 3, wherein the topic model framework uses the set of sections as a set of documents, uses each function of the distribution of functions as a topic, and uses the mobility patterns as words.

6. The system of claim 1, wherein the estimating the functionality intensity is based on a Kernel Density Estimation (KDE) model, wherein origin and destination data of the mobility patterns is provided as input to the KDE model.

7. The system of claim 1, wherein the annotating each of the functional groups comprises annotating each of the functional groups with semantic terms as part of a semi-manual process based on human-labeled portions of the area.

8. The system of claim 1, wherein the inferring the distribution of functions further comprises generating a leaving transition matrix and an arriving transition matrix which represents leaving mobility patterns and arriving mobility patterns, respectively, obtained over a period of time.

9. The system of claim 1, wherein the function distribution module is further configured to determine one or more representative mobility patterns of each of the sections using a term frequency-inverse document frequency (TF-IDF) technique.

10. A method of determining functional groups of an area, comprising:
 segmenting, by one or more processors, a map of the area into sections;
 for each section:
  determining, by the one or more processors, mobility patterns of users leaving from and arriving at the section,
  determining, by the one or more processors, a number of points of interest (POIs) in each of a plurality of point of interest (POI) categories that are located in the section to obtain a POI feature vector for the section, and
  inferring, by the one or more processors, a distribution of functions for the section according to a topic model framework based at least in part on the mobility patterns and the POI feature vector;
 clustering, by the one or more processors, the sections into a set of functional groups based at least in part on a similarity between the distribution of functions for each section;
 estimating, by the one or more processors, a functionality intensity for each of the functional groups based at least in part on the mobility patterns of each section; and
 annotating each of the functional groups based at least in part on the POI feature vectors, the mobility patterns and the functionality intensity associated with each of the functional groups.

11. The method of claim 10, wherein the topic model framework applies the section as a document, applies each function of the distribution of functions as a topic, applies the mobility patterns as words, and applies the POI feature vector as metadata.

12. The method of claim 10, wherein the mobility patterns comprise leaving mobility patterns and arriving mobility patterns determined over a period of time, each leaving mobility pattern describing a leaving time when the users leave from the section and a destination section that the users leave toward, each arriving mobility pattern describing an arriving time when the users arrive at the section and an origin section that the users arrive from.

13. The method of claim 10, wherein the POI feature vector is based at least in part on calculating a frequency density of each of the plurality of POI categories.

14. A method comprising:
 segmenting, by one or more processors, a map of an area into sections;
 inferring, for each section and by the one or more processors, a distribution of functions according to a topic model framework which uses mobility patterns of users leaving from and arriving at the section and points of interest (POIs) in the section;
 clustering, by the one or more processors, the sections based at least in part on a similarity of the distribution of functions between each of the sections to obtain functional groups;
 estimating, by the one or more processors, a functionality intensity for each of the functional groups; and
 annotating each of the functional groups on a visual representation of the area.

15. The method of claim 14, wherein the topic model framework uses the section as a document, uses each function of the distribution of functions as a topic, uses the mobility patterns as words, and uses a point of interest (POI) feature vector of the POIs in the section as metadata.

16. The method of claim 15, wherein the POI feature vector is based at least in part on calculating a frequency density of each of a plurality of POI categories.

17. The method of claim 14, wherein the inferring the distribution of functions further comprises generating a leaving transition matrix and an arriving transition matrix which represents a frequency of the mobility patterns.

18. The method of claim 14, wherein the estimating the functionality intensity is based on a Kernel Density Estimation (KDE) model, wherein an origin and a destination of each of the mobility patterns is provided as input to the KDE model.

19. The method of claim 14, wherein using the mobility patterns comprises determining one or more representative mobility patterns of each of the sections using a term frequency-inverse document frequency (TF-IDF) technique.

20. The method of claim 14, wherein the segmenting the map is based at least in part on a road network of the area.

* * * * *